(12) United States Patent
Dotson

(10) Patent No.: US 9,349,546 B2
(45) Date of Patent: May 24, 2016

(54) INDUSTRIAL AUTOMATION EMERGENCY STOP WITH STATE INDICTOR

(71) Applicant: ROCKWELL AUTOMATION TECHNOLOGIES, INC., Mayfield Heights, OH (US)

(72) Inventor: Gary Dotson, Muskego, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 411 days.

(21) Appl. No.: 13/756,186

(22) Filed: Jan. 31, 2013

(65) Prior Publication Data

US 2014/0211358 A1 Jul. 31, 2014

(51) Int. Cl.
  *H01H 9/00* (2006.01)
  *H01H 3/02* (2006.01)
  *H01H 9/16* (2006.01)
  *H01H 47/00* (2006.01)

(52) U.S. Cl.
  CPC .............. *H01H 9/00* (2013.01); *H01H 3/022* (2013.01); *H01H 9/161* (2013.01); *H01H 47/002* (2013.01)

(58) Field of Classification Search
  CPC ........................... H01H 69/00; H01H 2203/00
  USPC ........................................................ 361/115
  See application file for complete search history.

(56) References Cited

U.S. PATENT DOCUMENTS

| 2008/0046102 A1* | 2/2008 | Kalhoff et al. ................... 700/78 |
| 2009/0030550 A1  | 1/2009 | Nagata et al. |
| 2013/0042516 A1* | 2/2013 | Lehman ........................... 43/4.5 |
| 2013/0098712 A1* | 4/2013 | Svendsen et al. ............. 187/381 |

FOREIGN PATENT DOCUMENTS

| DE | 10344385 A1 | 5/2005 |
| DE | 102006029067 A1 | 1/2008 |
| EP | 1780738 A1 | 2/2007 |
| WO | 02078913 A1 | 10/2002 |
| WO | 2006049554 A1 | 5/2006 |

OTHER PUBLICATIONS

Extended European search report from EP Application No. 14153187.1 dated May 26, 2014, 7 pgs.

* cited by examiner

*Primary Examiner* — Dharti Patel
(74) *Attorney, Agent, or Firm* — Fletcher Yoder P.C.

(57) ABSTRACT

The embodiments described herein include a system and a method. One embodiment provides an industrial automation system an emergency stop system configured to interrupt power to at least a portion of an industrial control system. The industrial automation system further includes a user perceptible indicator associated with the emergency stop system that in use provides an indication to a user of an operative state of the emergency stop system.

19 Claims, 3 Drawing Sheets

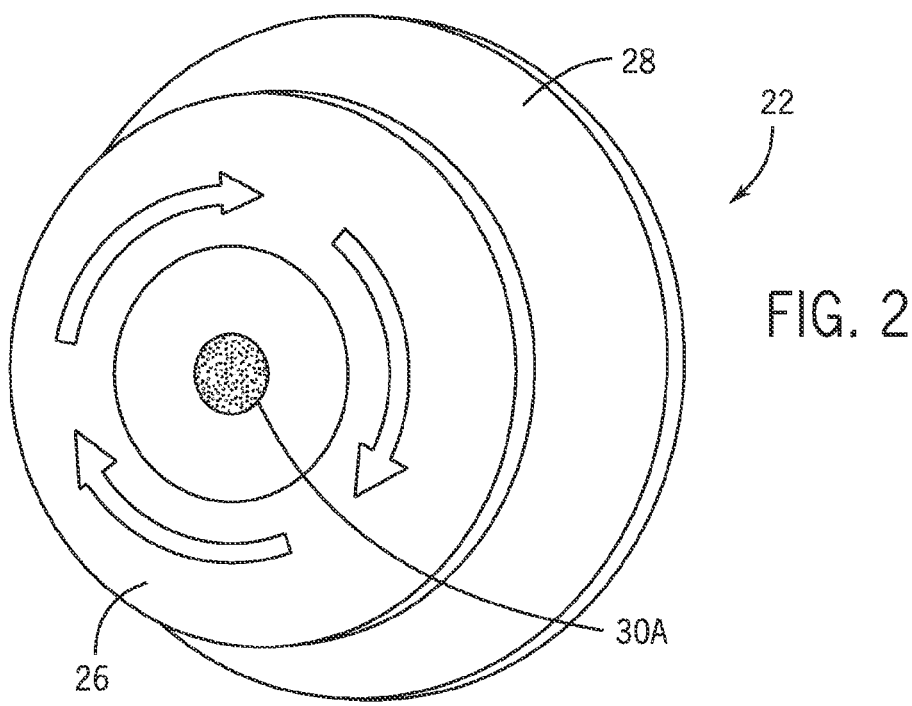
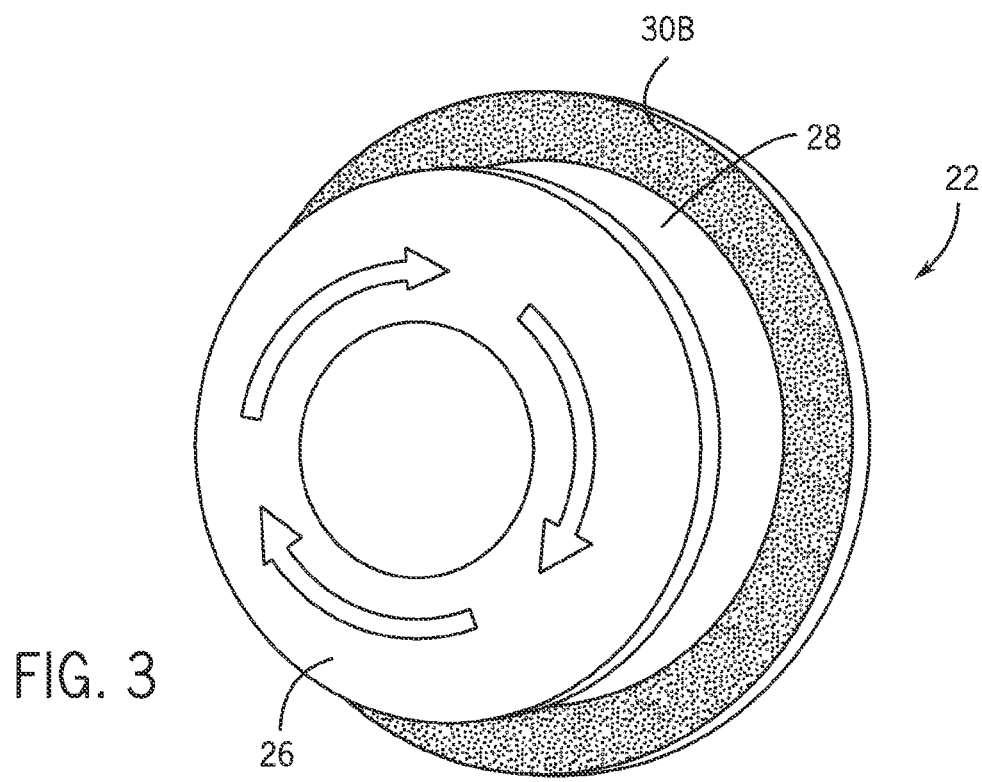

INDUSTRIAL AUTOMATION EMERGENCY STOP WITH STATE INDICTOR

BACKGROUND

The invention relates generally to a system for controlling devices within an industrial automation system. More particularly, embodiments of the present disclosure relate to emergency stop systems used in industrial automation systems.

Industrial automation systems are known for automating industrial processes. For example, industrial automation systems have been used for material handling, robotics, airport baggage handling, water and wastewater treatment, cement production, semiconductor fabrication, electric power, entertainment, food processing, mining, beverage and packaging operations, ski lift operations, forest products processing, life sciences, logistic processes, fibers and textiles processing, metal forming, automotive, petroleum and chemical processing, plastics processing, automated transportation, health care, agriculture, postal and shipping, and other manufacturing processes, to name but a few examples.

Accordingly, an industrial automation system may include components, such as controllers, automation devices, actuators, and sensors, often interconnected by one or more networks. In addition, certain of the operations of at least some of these components in the industrial automation system may be immediately terminated by an emergency stop (E-Stop) system. The E-Stop system may include one or more E-Stop buttons connected to an E-Stop network, and positioned such that operators may easily access them when needed. The E-Stop system may be configured to immediately terminate operations of components in the industrial automation system when the E-Stop button is actuated/activated. Because there may be more than one E-Stop button in the E-Stop system, to facilitate identifying which E-Stop button was actuated, the E-Stop button may be configured to illuminate green to indicate that it has been actuated/activated.

In addition, in some E-Stop systems, the E-Stop button or a device on which the button is provided may be removable from the industrial automation system, such as by unplugging a tether, removing or cutting a cord, or moving out of a working range of a network node. When such communication is interrupted, the emergency stop functionality of the device and the associated E-stop button may be no longer operational, although conventional systems may not alert the operators to this fact. Accordingly, it may be beneficial to configure the E-Stop system to indicate when the E-Stop button is operational (i.e., capable of immediately terminating operations of components in the industrial automation system if actuated/activated).

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In accordance with a first aspect, the present disclosure provides an industrial automation system including an emergency stop system configured to interrupt power to at least a portion of an industrial control system. The industrial control system further includes a user perceptible indicator associated with the emergency stop system that in use provides an indication to a user of an operative state of the emergency stop system.

Further, the present disclosure sets forth an industrial automation emergency stop system including an emergency stop circuit coupled to an emergency stop button, in which the emergency stop circuit is configured to interrupt power to an automation device, a sensor, an automation controller, or any combination thereof when the emergency stop circuit is operative and the emergency stop button is actuated. The emergency stop circuit includes state detection logic configured to determine whether the emergency stop button is in an operative state.

Still further, the disclosure sets out an industrial automation system including a first operational zone and an emergency stop system configured to be communicatively coupled to the first operational zone when the emergency stop system is within the first operational zone. The emergency stop system is configured to interrupt power to at least a portion of the first operational zone when it is communicatively coupled to the first operational. The industrial automation system further includes a user perceptible indicator associated with the emergency stop system that in use provides an indication to a user of an operative state of the emergency stop system.

DRAWINGS

These and other features, aspects, and advantages of the present invention will become better understood when the following detailed description is read with reference to the accompanying drawings in which like characters represent like parts throughout the drawings, wherein:

FIG. 2 is a perspective view of an emergency stop (E-Stop) button with a state indicator.

FIG. 3 is a perspective view of an alternate embodiment of an emergency stop (E-stop) button with a state indicator.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is generally directed towards an E-Stop system disposed in an industrial automation system that may be configured to immediately cease operation of components in the industrial automation system, such as controllers, devices, and sensors. In some embodiments, the E-Stop system may include an E-Stop button configured to immediately disconnect power to components in the industrial automation system when actuated. However, an E-Stop button (or a device on which the button itself is installed) may be detached or disconnected from the E-Stop system and the industrial control system. When detached, the E-Stop button may give an incorrect impression to an operator that it is still functional and capable of immediately terminating operation of devices in the industrial control system.

Accordingly, one disclosed embodiment provides an industrial automation system including an emergency stop system configured to interrupt power to at least a portion of an industrial control system. The industrial automation system may further include a user perceptible indicator associated with the emergency stop system that in use provides an indication to a user of an operative state of the emergency stop system. In other words, a user perceptible indicator, such as a light, may indicate to a user or operator whether the E-Stop button is connected to the industrial control system and capable of immediately terminating operation of components in the industrial control system.

Figure 1:
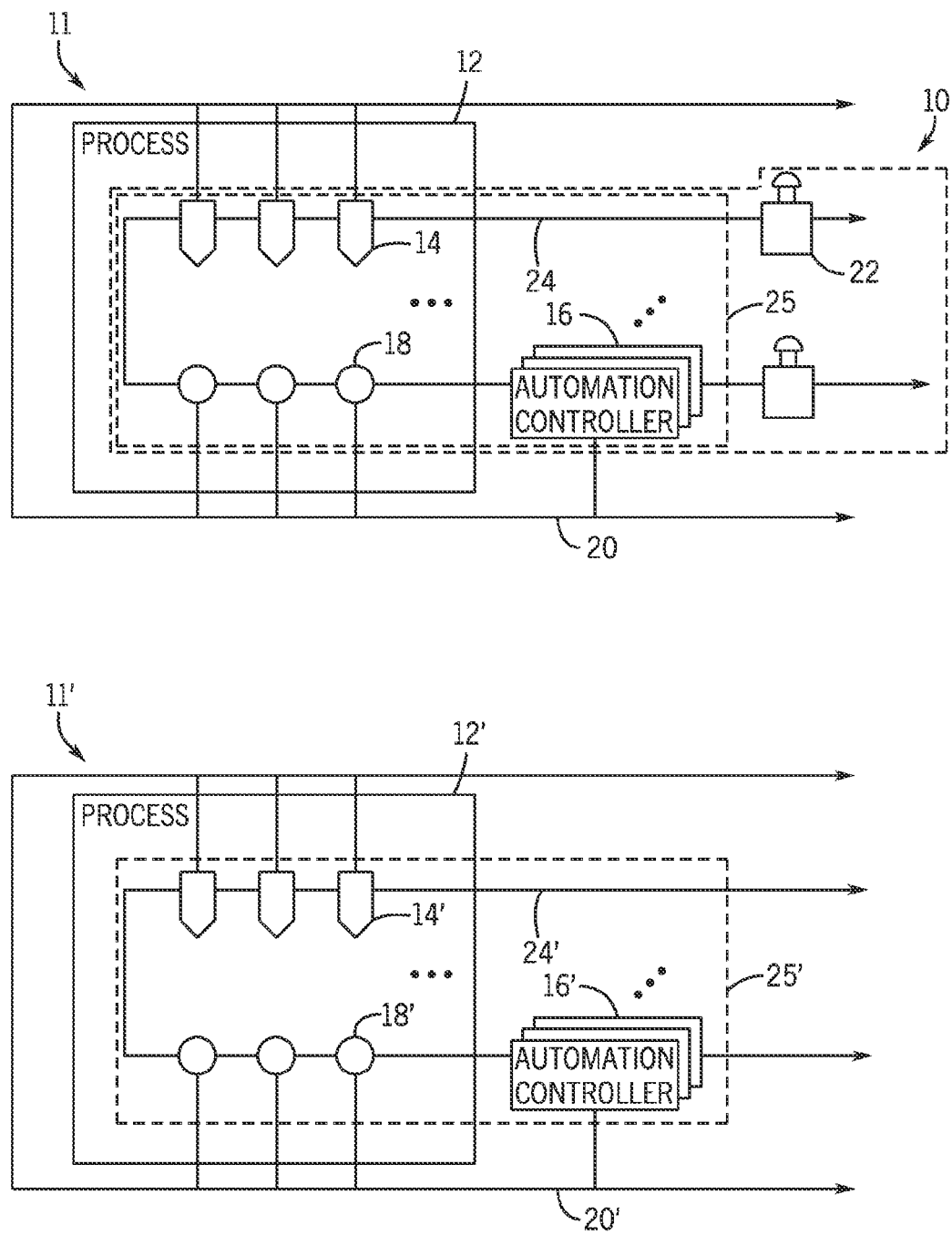
FIG. 1 is a block diagram of an emergency stop (E-Stop) system within an industrial automation system, in accordance with an embodiment.

By way of introduction, FIG. 1 shows an emergency stop (E-Stop) system 10 within an industrial automation system 11. The industrial automation system 11 may automate a process 12, such as a manufacturing process, a material handling process, a transportation process, and so forth. Accordingly, the process 12 may include any type of machine or automation device 14 that may operate within the industrial automation system 11, such as actuators, electric motors, drive systems, and the like. Generally, the automation devices 14 may be operated or controlled by an automation controller 16. In addition, the automation control 16 may receive various type of information from sensors and input devices 18, such as push-buttons, presence and proximity sensors, temperature sensors, and so forth. Accordingly, the automation controller 16 may include a processor component, a memory component, and a communication component such that it may operate the automation devices 14 by sending control signals to the automation devices 14 and receive inputs and data from the input devices and sensors 18 via a communication network 20.

As described above, the E-Stop system 10 may be configured to immediately cease operation of certain of the components (or at least some of their functionality), such as the automation controller 16, the automation devices 14, or the sensors 18, in the industrial control system 11. Accordingly, the E-Stop system 10 may include one or more an E-Stop buttons 22 (or devices on which such buttons are provided) configured to enable a user or operator to indicate a desire to cease operation of the components by actuating/activating (e.g., depressing) the E-Stop button 22. The E-Stop system 10 may then immediately terminate operation of the components by interrupting power to the components. Accordingly, as depicted, the E-Stop button 22 is coupled to a first operational zone 25 which includes components, such the automation controller 16, the automation devices 14, or the sensors 18, via an E-Stop network 24.

In addition, the E-Stop system 10 or the E-Stop button 22 may be inadvertently or intentionally disconnected from the first operational zone 25. For example, when the E-Stop system 10 or the E-Stop button 22 is tethered to the first operational zone 25, the E-Stop system 10 or the E-Stop button 22 may be disconnected when the tether is removed or cut. On the other hand, the E-Stop system 10 or the E-Stop button 22 may be intentionally disconnected and connected to a second operational zone 25'. It should be appreciated that when the E-Stop system 10 or the E-Stop button is connected to the second operational zone 25', a handshaking process may occur with the second operational zone 25'. Once the E-Stop button 22 is connected to the second operational zone 25', the E-Stop button 22 may be configured to enable a user or operator to indicate a desire to cease operation of the components in the second operational zone 25' by actuating the E-Stop button 22. The second operational zone 25' may include components such as an automation controller 16', automation devices 14', and sensors 18'.

The E-Stop button 22, as described, may be subject to global governing standards, such as International Electrotechnical Commission (IEC) 60204-1. IEC 60204-1 relates to electrical equipment and to disabling such equipment. Included in IEC 60204-1 are standards governing E-Stop buttons 22. Specifically, section 10 of the standard states that E-Stop buttons 22 should be colored red and the background surrounding the E-Stop button 22 should be colored yellow. In addition, section 10 states that the red color of the E-Stop button should not depend on the illumination of light. Accordingly, the present techniques meet the standards set out in IEC 60204-1, yet provide innovative solutions designed to notify operators that the E-stop button, or a device on which the button is provided, is operational (i.e., depressing the button will be effective to perform the intended interruption).

FIG. 2 illustrates an embodiment of the E-Stop button 22 with a user perceptible indicator. The E-Stop button 22 may include a body 26 and a background 28. In addition, the user perceptible indicator may be configured to provide an indication to a user of an operative state of the E-Stop system 10. In some embodiments, the user perceptible indicator may be a light that turns on whenever the E-Stop system is operative and capable of interrupting power to at least a portion of an industrial control system 11. The light may come from a light source 30A, such as light bulb (e.g., LED or other).

As illustrated, the light source 30A may be disposed in the E-Stop button 22. In one embodiment, the light source 30A may be embedded in body 26 of the E-Stop button 22. The body 26 may be generally translucent to enable the light from light source 30A to shine through. Thus, the E-Stop button may be configured to be a first color and change to a second color when the light source 30A is illuminated. As described above, the present techniques meet the IEC 60204-1 standard. Accordingly, the first color may be a dark red which changes to a lighter red when the light source 30A is illuminated. Alternatively, the E-Stop button may be gray and change to red when the light source 30A is illuminated. In another embodiment, the light source 30A may be disposed in a recess of the generally opaque body 26. Accordingly, the body 26 may be an opaque red.

FIG. 3 illustrates an alternative embodiment of the E-Stop button 22 with a user perceptible indicator. As illustrated, the light source 30B may be disposed adjacent to the E-Stop button 22. For example, the light source 30B may form a ring around the E-Stop body 26. As described above, the present techniques meet the IEC 60204-1 standard. Accordingly, the E-Stop body 26 may be red and the light source 30B may illuminate to yellow, for example.

Figure 4:
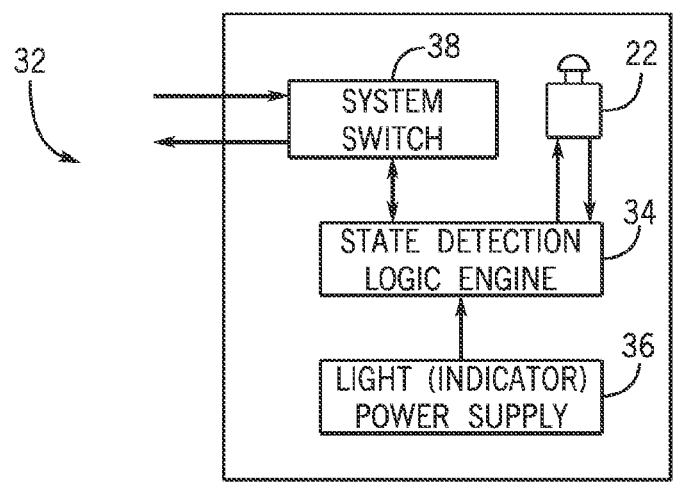
FIG. 4 is a block diagram of emergency stop (E-Stop) circuit controlling a user perceptible indicator.

FIG. 4 illustrates the logic in an E-Stop circuit 32 that controls the user perceptible indicator. The E-Stop circuit 32 may be included in the E-Stop system 10 and configured to interrupt power to a component of the industrial control system 11. Accordingly, the E-Stop circuit 32 may include a state detection logic engine 34, a light/indicator power supply 36, and a system switch 38.

The state detection logic engine 34 may be communicatively coupled to the E-Stop button 22 and configured to determine whether the E-Stop button 22 is in an operative state. In other words, the state detection logic engine 34 may determine whether power to components of the industrial control system 11 will be interrupted when the E-Stop button 22 is actuated. Accordingly, the state detection logic engine 34 may include a processor component and a memory component. Conditions that may cause the E-Stop button 22 to be inoperative include a disconnected E-Stop button 22, a disconnected E-Stop system 10, or a malfunctioning E-Stop system 10. For example, the state detection logic engine 34 may communicate with the E-Stop button 22 and the industrial control system 11 to determine whether the E-Stop button 22 is connected to the industrial control system 11 and functioning properly.

In addition, as described above, the E-Stop system 10 or the E-Stop button 22 may be disconnected and reconnected to various operational zones (i.e., 25 and 25'). Accordingly, the state detection logic engine 34 may also be configured to handle the handshaking process. For example, when the E-Stop system 10 is connected to an operational zone (e.g., 25 or 25'), the state detection logic engine may determine whether the E-Stop system 10 has permission to control the operational zone. This may include prompting an operator whether to connect the E-Stop system 10 to the operational zone.

When the state determination logic engine 34 determines that the E-Stop button 22 is operative, the state detection logic engine 34 may be configured to indicate to a user the operative state of the E-Stop button 22 through the user perceptible indicator. As described above, the user perceptible indicator may be a light source (e.g. 30A and 30B). Accordingly, the state determination logic engine 34 may provide power from the light/indicator power supply 36 to illuminate the light source (e.g. 30A and 30B). For example, when the E-Stop button 22 is connected to the industrial control system 11, the state determination logic engine 34 supplies power to the light source (e.g. 30A and 30B), which illuminates the light and indicates that the E-Stop button 22 is operative.

As described above, when the E-Stop button 22 is operative and actuated, power is interrupted to at least part of the industrial control system 11. Specifically, the system switch 38 may be coupled to the state detection logic engine 36 to determine when to interrupt power. For example, when the E-Stop button 22 is operative and actuated, the E-Stop button 22 communicates to the state detection logic engine 34 that power should be interrupted. The state detection logic 34 then communicates to the system switch 38 to cut power to components in the industrial control system 11, such as the automation devices 14, the sensors 18, the automation controllers 16, or any combination thereof. In some embodiments, the system switch 38 may bypass power from the component. Accordingly, the system switch 38 may connect to components in the industrial control system 11 through the E-Stop network 24.

When the state determination logic engine 34 determines that the E-Stop button 22 is inoperative, the light source (e.g. 30A and 30B) should not be illuminated. Accordingly, if the E-Stop button 22 is actuated, power should not be interrupted to components in the industrial control system 11.

Figure 5:
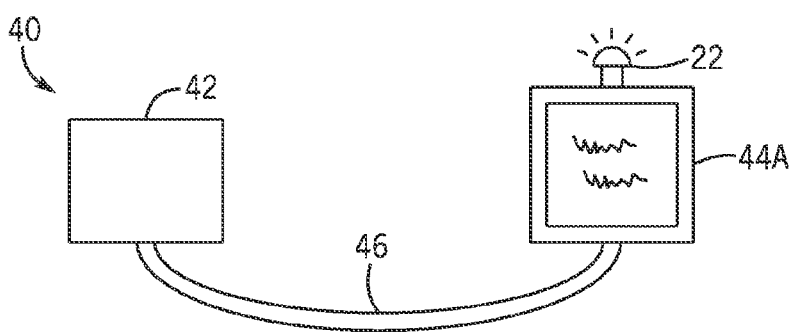
FIG. 5 is an embodiment showing an emergency stop (E-Stop) button coupled to a server.
Figure 6:
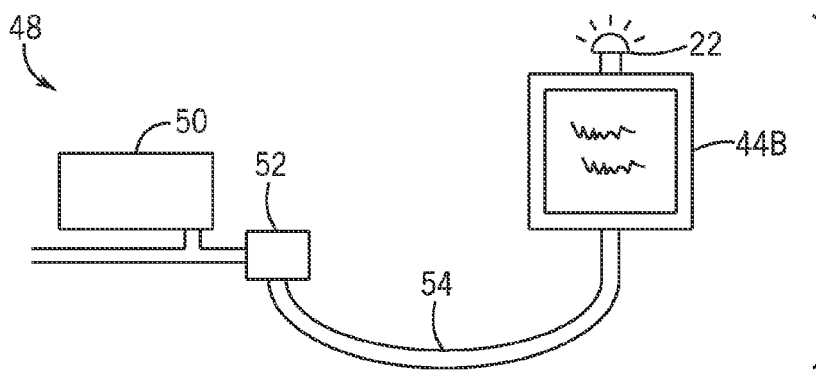
FIG. 6 is an embodiment showing an emergency stop (E-Stop) button coupled to a connection box.
Figure 7:
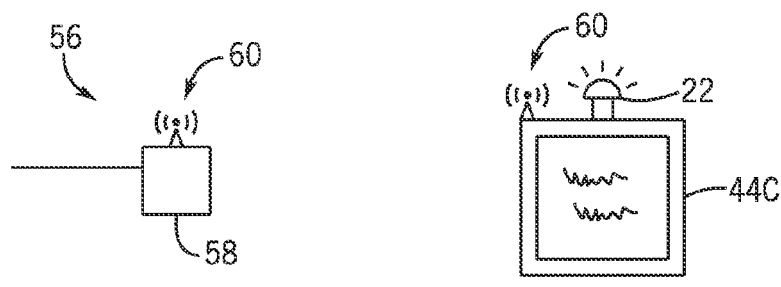
FIG. 7 is an embodiment showing an emergency stop (E-Stop) button wirelessly coupled to a docking station.

FIG. 5-FIG. 7 illustrate various embodiments of the E-Stop button 22 coupled to the industrial control system 11. Each embodiment may depict scenarios which may cause the E-Stop button 22 to become inoperative. For example, FIG. 5 illustrates a first tethered configuration 40. The first tethered configuration 40 includes a server 42, a terminal 44A, and a cable 46, which couples the server 42 and the terminal 44A. In addition, the terminal 44A may include the E-Stop button 22 with the user perceptible indicator such as the one depicted in FIG. 2.

In the first tethered configuration 40, the terminal 44A may be configured to be a "thin" terminal. In other words, server 42 may be configured to perform most of the operations; whereas, the terminal 44A may be configured to simply display information. Thus, the server 42 may include the E-Stop circuit 32 while the terminal 44A houses the E-Stop button 22. Accordingly, the user perceptible indicator, such as light source 30A, may indicate that the E-Stop button 22 is inoperable when the terminal 44A is disconnected from the server 42 because the E-Stop button 22 is disconnected from the rest of the E-Stop system 10. And assuming that the E-Stop system 10 is otherwise functioning properly, when the terminal 44A, including the E-Stop button 22, is connected to the server 42, the user perceptible indicator may indicate that the E-Stop button 22 is operable by illuminating the light source 30A.

FIG. 6 illustrates a second tethered configuration 48. The second tethered configuration 48 includes a connection box 50, including an Ethernet switch 52, a terminal 44B, and an Ethernet cable 54, which couples the terminal 44B to the Ethernet switch 52. Similar to the terminal 44A in the first tethered configuration 40, terminal 44B may include the E-Stop button 22 with the user perceptible indicator such as the one depicted in FIG. 2.

In the second tethered configuration 48, the terminal 44B may be configured to be a "thick" terminal. In other words, terminal 44B may be configured to perform most of the operations; whereas, the connection box 50 is configured to connect the terminal 44B to the industrial control system 11 through the Ethernet switch 52. Thus, the terminal 44B may include the E-Stop system 10. Accordingly, the user perceptible indicator, such as the light sources 30A, may indicate that the E-Stop button 22 is inoperable when the terminal 44B is disconnected from the Ethernet switch 52 because the E-Stop system 10 is disconnected from the industrial control system 11. And again assuming that the E-Stop system 10 is otherwise functioning properly, when the terminal 44B is connected to the Ethernet switch 52, the user perceptible indicator should indicate that the E-Stop button 22 is operable by illuminating the light source 30A.

As described above, in both tethered configurations (i.e., 40 and 48) the terminals (i.e., 44A and 44B) may be intentionally or inadvertently disconnected from the industrial control system 11. For example, the terminals (i.e., 44A and 44B) may be inadvertently disconnected when the cables (i.e., 46 or 54) are removed or cut. In addition, the terminals (i.e., 44A and 44B) may be intentionally removed to stop the operation of the E-Stop button 22. In addition, the terminals (i.e., 44A and 44B) may also be disconnected and moved between various operational zones (e.g., 25 and 25').

FIG. 7 illustrates a wireless configuration 56. The wireless configuration 56 includes a docking station 58 and a terminal 44C. The docking station 58 and the terminal 44C may be configured to communicate wirelessly, such as in one of the protocols set out in Institute of Electrical and Electronics Engineers (IEEE) 802.11. Accordingly, both may include a wireless adapter 60. Similar to the terminal 44A and 44B, terminal 44C may include the E-Stop button 22 with the user perceptible indicator such as the one depicted in FIG. 2.

In the wireless configuration 56, the terminal 44C may be a "thin" or a "thick" terminal. In other words, the terminal 44C may be configured to house the E-Stop button 22, the entire E-Stop system 10, or any combination in between.

Similar to the embodiments described above, the user perceptible indicator may indicate when the E-Stop button 22 is operable. However, because the terminal 44C is wireless and no longer tethered, other conditions may factor into whether the E-Stop button 22 is operable. For example, the terminal 44C may be out of the wireless range of the docking station 58, which may inhibit the ability for the terminal 44C to communicate with the industrial control system 11. Accordingly, the E-Stop button 22 should be inoperable and the user perceptible indicator, light source 30A, should indicate as much.

Alternatively, although the terminal 44C is not out of wireless range, it may be intentionally out of the operational zone of control. In other words, the operational zones (i.e., 25 and 25') depicted in FIG. 1 may represent the areas where it is desirable for the E-Stop button 22 to be operable. When the terminal 44C leaves the operational zones (i.e., 25 and 25'), it may be undesirable for the E-Stop button 22 on the terminal 44C to remain operational because the E-Stop button 22 is no longer in the vicinity of the components (e.g., automation devices 14, sensors 18, or automation controllers 16). In addition, a handshaking process should occur when the terminal 44C enters one of the operational zones (i.e., 25 and 25') to ensure that the operator intended to connect the E-Stop button 22. For example, the E-Stop system 10 may prompt the operator on the terminal 44C display whether the operator would like terminal 44C to connect to the operational zone (i.e., 25 and 25'). Other conditions may include obstruction of wireless signal, loss of power to the terminal 44C, interference in the wireless signal, or the like.

The techniques described herein may improve the reliability of E-Stop systems 10 within industrial control systems 11. In particular, the techniques herein may improve reliability of the E-Stop system 10 by using a user perceptible indicator, such as light sources (e.g. 30A and 30B), to indicate whether the E-Stop button 22 is operational. With the use of the user perceptible indicator, a user may be informed whether to use the E-Stop button 22 or to find another method to cease operation of components, such as automation devices 14, sensors 18, or automation controllers 16, in the industrial control system 11.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An emergency stop button comprising:
a button body; and
a user perceptible indicator configured to provide a visual indication of when the emergency stop button is in an operative state, wherein the emergency stop button is in the operative state when communicatively coupled to an emergency stop system and the emergency stop system is capable of interrupting power to at least a portion of an industrial automation system if the emergency stop button is actuated;
wherein the user perceptible indicator comprises a light source that is illuminated to indicate the operative state of the emergency stop button such that the button body is configured to be a same color when the emergency stop button is in the operative state and when the emergency stop button is not in the operative state.

2. The emergency stop button of claim 1, wherein the user perceptible indicator comprises a light source disposed directly adjacent to the button body.

3. The emergency stop button of claim 1, wherein the user perceptible indicator is configured to have a first color when the emergency stop button is in the operative state and to change color to a second color when the emergency stop button is not in the operative state.

4. The emergency stop button of claim 3, wherein the first color is yellow.

5. The emergency stop button of claim 1, wherein the emergency stop button is not operative when not communicatively coupled to the emergency stop system.

6. The emergency stop button of claim 1, wherein the button body comprises a generally opaque colored body, and the user perceptible indicator comprises a light source disposed in a recess in the button body so as to be visible to a user.

7. The emergency stop button of claim 6, wherein the button body and the light source are red.

8. The emergency stop button of claim 1, wherein the user perceptible indicator is configured to provide a visual indication of when the emergency stop system is not in the operative state.

9. The emergency stop button of claim 1, wherein the user perceptible indicator comprises a light source disposed in a circle around the button body.

10. The emergency stop button of claim 1, wherein the same color is red.

11. An industrial automation emergency stop system comprising:
an emergency stop circuit coupled to an emergency stop button, wherein the emergency stop circuit is configured to interrupt power to an automation device; a sensor, an automation controller, or any combination thereof when the emergency stop circuit is in an operative state and the emergency stop button is actuated; and
state detection logic configured to determine whether the emergency stop circuit is in the operative state,
wherein the emergency stop button is configured to be a first version of a color when the emergency stop circuit is in the operative state and a second version of the color when the emergency stop circuit is not in the operative state.

12. The system of claim 11, comprising a light source configured to facilitate changing the emergency stop button from the first version of the color to the second version of the color and vice versa.

13. The system of claim 12, wherein the light source is disposed within the emergency stop button.

14. The system of claim 11, wherein the first version of the color is a light red color and the second version of the color is a dark red color.

15. A method of operating an emergency stop system, comprising:
determining, using state detection logic, whether the emergency stop system is operative;
in response to determining that the emergency stop system is operative, instructing an emergency stop button, using the state detection logic, to change from a first version of a color to a second version of the color, wherein the second version of the color is configured to indicate that the emergency stop system will cut power to an industrial automation system when the emergency stop button is actuated and the first version of the color is configured to indicate that the button is an emergency stop button that is not operative.

16. The method of claim 15, wherein the first version of the color is dark red and the second version of the color is light red.

17. The method of claim 15, wherein instructing the emergency stop button to change from the first version of the color to the second version of the color comprises instructing a light source disposed within the emergency stop button to turn on.

18. The method of claim 15, comprising, in response to determining that the emergency stop system is not operative, instructing the emergency stop button to change from the second version of the color to the first version of the color.

19. The method of claim 18, wherein instructing the emergency stop button to change from the second version of the color to the first version of the color comprises instructing a light source disposed within the emergency stop button to turn off.

* * * * *